INVENTORS.
ISAAC L. WILCOX.
ANTHONY JOHN COLUMBUS, JR.
BY
D. Emmett Thompson
THEIR ATTORNEY.

INVENTORS.
ISAAC L. WILCOX.
ANTHONY JOHN COLUMBUS, JR.
BY
*D. Emmett Thompson*
THEIR ATTORNEY.

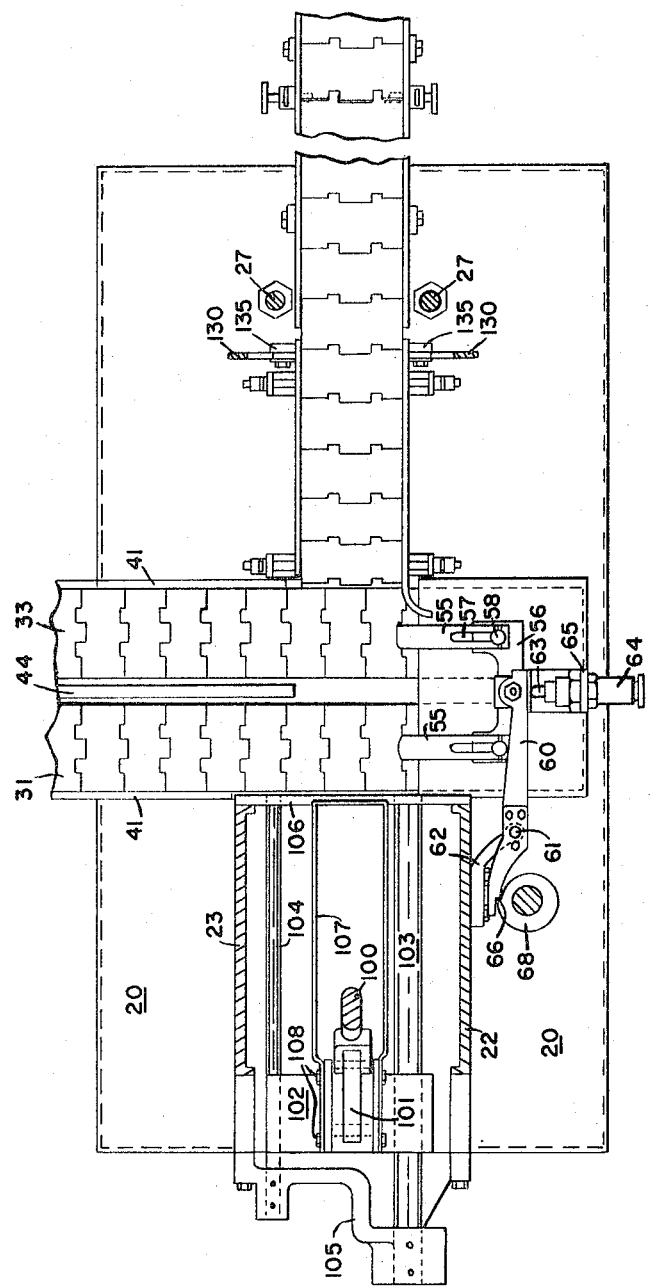

Feb. 28, 1967   I. L. WILCOX ETAL   3,306,802
HANDLE APPLYING MACHINE
Filed July 16, 1963   12 Sheets-Sheet 6
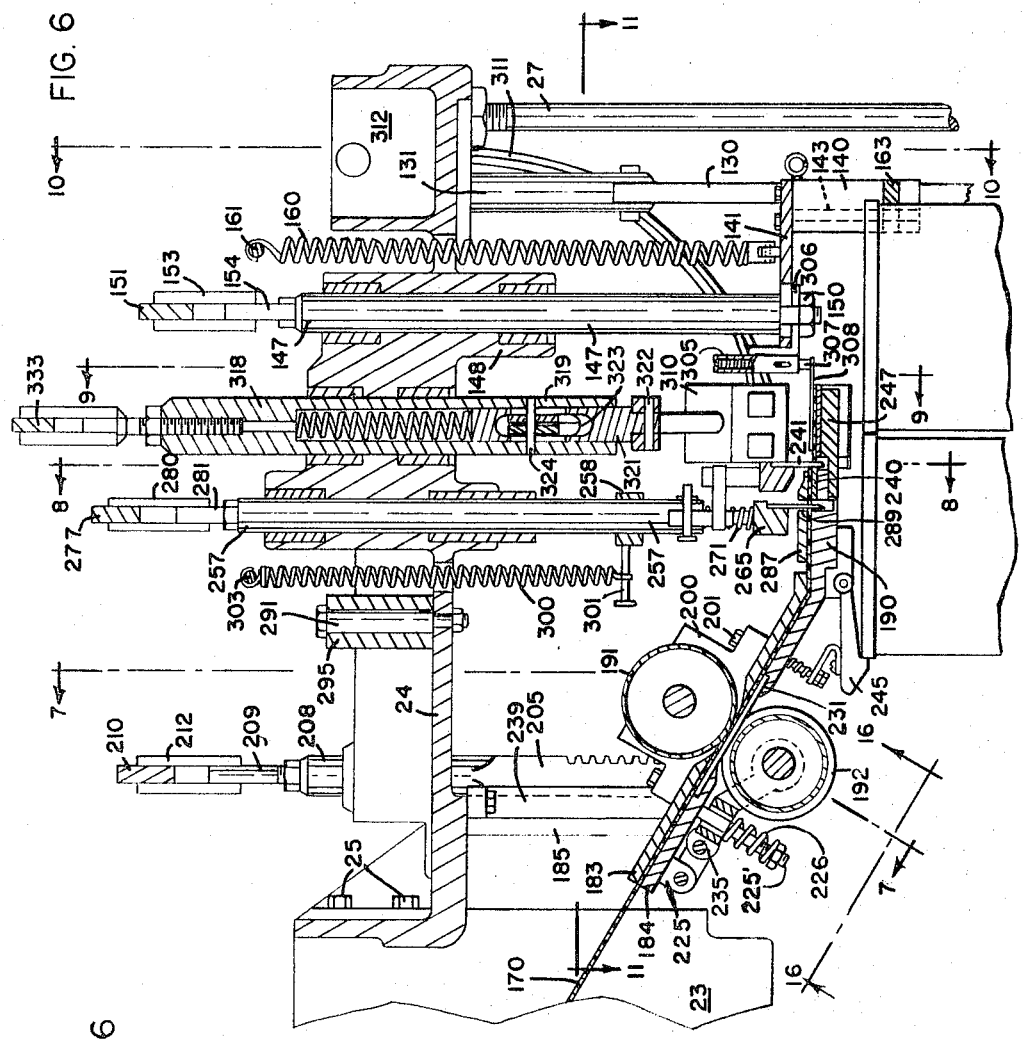
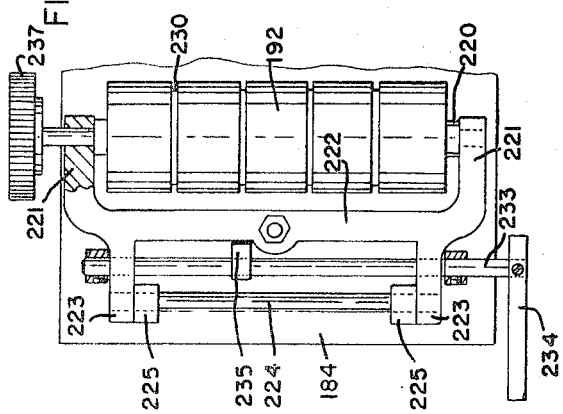
INVENTORS.
ISAAC L. WILCOX.
ANTHONY JOHN COLUMBUS, JR.
BY
D. Emmett Thompson
THEIR ATTORNEY.

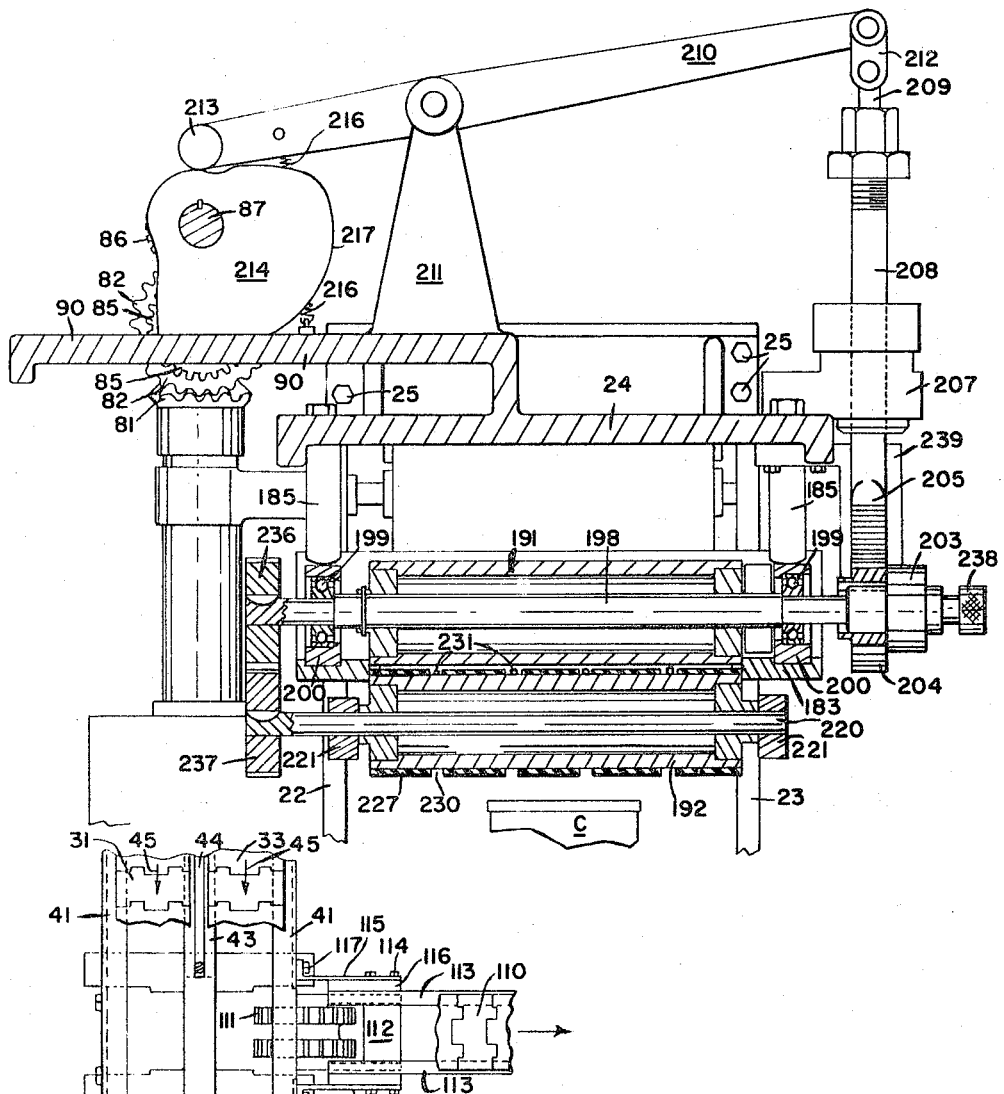

Feb. 28, 1967 — I. L. WILCOX ETAL — 3,306,802
HANDLE APPLYING MACHINE
Filed July 16, 1963 — 12 Sheets-Sheet 8

INVENTORS.
ISAAC L. WILCOX.
ANTHONY JOHN COLUMBUS, JR.
BY
D. Emmett Thompson
THEIR ATTORNEY.

United States Patent Office 3,306,802
Patented Feb. 28, 1967

3,306,802
HANDLE APPLYING MACHINE
Isaac L. Wilcox and Anthony John Columbus, Jr., Fulton, N.Y., assignors to Phillips Petroleum Company, a corporation of Delaware
Filed July 16, 1963, Ser. No. 295,562
13 Claims. (Cl. 156—355)

This invention relates to a machine for applying a handle band of thin sheet material to a pair of containers, rectangular in cross section.

More particularly, it has to do with a machine for applying a handle band to a pair of containers formed of paperboard, the handle band being formed of thin, sheet material coated on one side with thermoplastic material, the machine functioning to heat seal the end portions of the band to opposite sides of a pair of containers arranged in upstanding side by side abutting relation, the ends of the band overlying the junction between the containers, whereby the applied handle band also serves to attach the containers together to form a multi-unit package.

Such paperboard containers are used extensively in the packaging of milk for the retail trade. The filled containers are shipped from the dairy in cases which hold a plurality of containers.

A great deal of milk is now purchased in food markets. The filled containers are placed in refrigerated cabinets in close side by side relation. Most of the paper containers are formed with a flat top. It is difficult to remove the full containers from the shipping cases, and it is especially difficult for the customer, usually the housewife, to remove the filled containers from the refrigerated cabinets in the food markets. This is particularly the fact when the individual containers are of larger capacity, such as half-gallon. It is also inconvenient to carry these filled paperboard containers not provided with any form of handle.

A number of attempts have heretofore been made to provide these paperboard containers with a suitable handle. Such attempts have not resulted in a practical solution to the problem, partially from the standpoint of the cost of the handle structure and particularly, the cost and time consumed in applying the handles to the containers, and also in that the handle structures were not of practical form. Certain of such prior handle structures consists of a cardboard band wrapped about the upper ends of the containers and secured thereto, the band being formed with a stiff upstanding cardboard handle portion. Another such handle arrangement took the form of a stiff piece of cardboard inserted between the pair of containers, and secured to the containers by adhesive. In those forms, the upstanding handles were bent over and broken when the cases of containers were stacked, but especially they were impractical in the time consumed in completing the application of the handles to the containers.

This invention has as an object a machine for applying a handle band of thin flexible material to a pair of containers, the machine embodying an arrangement for substantially instantaneously bonding the ends of the handle band, by heat sealing, to opposite sides of the pair of containers with handle band extending above and parallel to the junction between the containers.

The invention has as a further object the embodiment of mechanism in the machine for weakening, as by perforations, the handle band in a direction lengthwise thereof, and medial of its side edges, whereby subsequent to the application of the handle band to the pair of containers, the containers may be separated to provide a handle for each individual container of the pair.

The invention consists in the novel features and in the combinations and constructions hereinafter set forth and claimed.

In describing this invention, reference is had to the accompanying drawings in which like characters designate corresponding parts in all the views.

In the drawings—

FIGURE 5 is a view taken on line 5—5, FIGURE 2.

FIGURE 6 is an enlarged view of the upper right portion of FIGURE 4.

FIGURE 7 is a view taken on line 7—7, FIGURE 6.

FIGURE 14 is a top plan view of the bracket arrangement in which the sprockets are mounted for the in-feed and out-feed container conveyors.

FIGURE 16 is a bottom plan view of a portion of the web feed mechanism, as indicated by the line 16—16, FIGURE 6.

Figure 2:
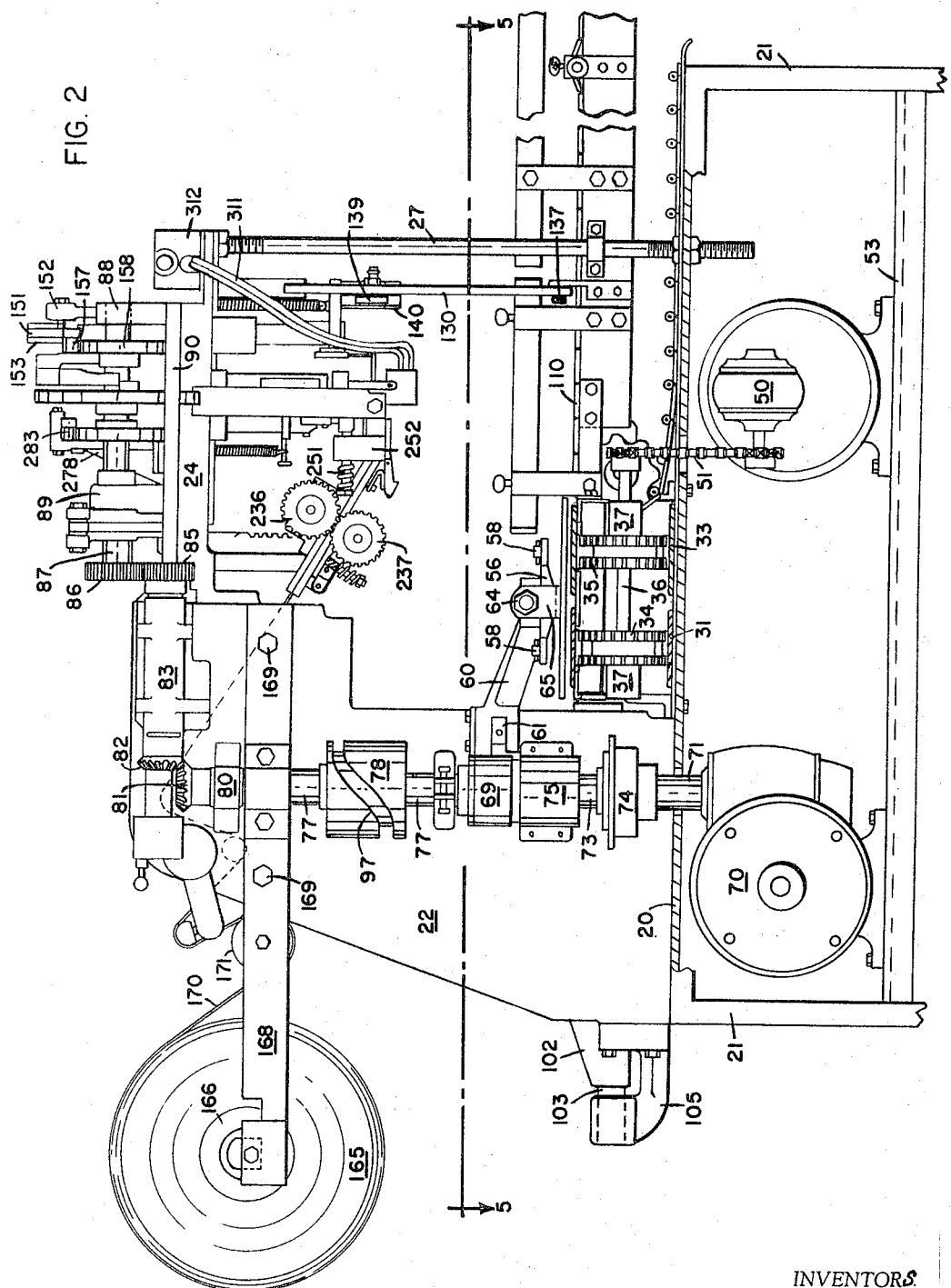
FIGURE 2 is a side elevational view looking upwardly in FIGURE 1.
Figure 3:
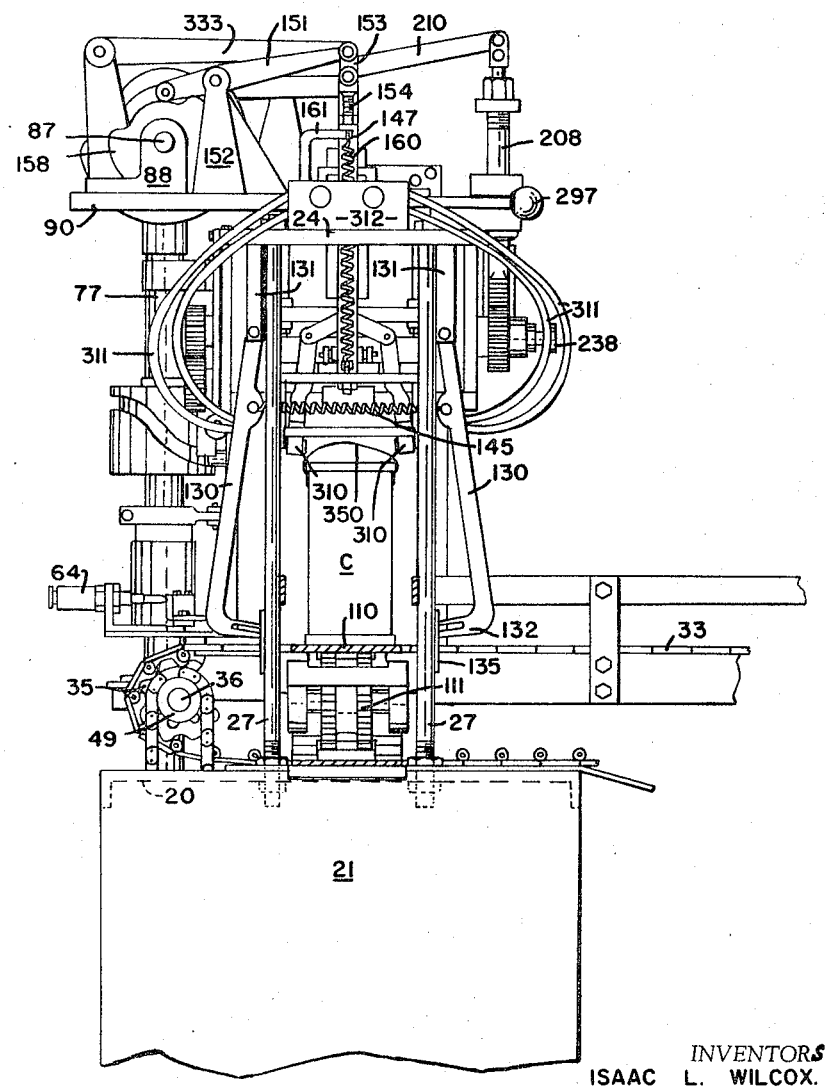
FIGURE 3 is an end elevational view looking to the left, FIGURE 1.

The frame of the machine consists of a base plate 20 supported by leg members 21, FIGURES 2 and 3. A pair of vertically disposed side plates 22, 23, are fixedly mounted on the base plate 20 and extend in spaced parallel relation. A top plate 24 is fixed at one end to the forward ends of the side plates 22, 23, adjacent the top edges thereof, as by screws 25. The forward end of the side plate 23 is supported by suitable posts 27, the lower ends of which are secured in the base plate 20. The side plates 22, 23, and the top plate 24 are preferably heavy cast metal members.

A pair of in-feed chain conveyors 31, 33 are positioned in closely spaced parallel relation, and are trained about sprockets 34, 35 mounted on a shaft 36 journalled in bearings 37 of a bracket member 38, see FIGURES 2 and 14. The bracket 38 is formed with side members 40, to which angle iron members 41 are attached and form rails which support the outer edge portions of the plates of the conveyors 31, 33. The inner edges of the plates being supported by a flat strip 43 are secured to a center rib 67 of the bracket 38. A guide strip 44 is attached to the upper surface of the strip 43 and serves as a separating guide for the containers moved inwardly to the machine by the upper runs of the conveyor chains 31, 33 which move in the direction of the arrows 45, FIGURE 14. A sprocket 49 is fixed to one end of the shaft 36 and is operatively connected to a drive motor 50 by a chain 51. The drive motor 50 is mounted on a shelf 53 in the base structure, see FIGURE 2.

The conveyors 31, 33, as stated, advance a pair of containers into the machine, the containers engaging bars 55 adjustably mounted on a cross member 56. The bars 55 are formed with elongated slots 57 to receive screws 58 which thread into the ends of the cross members 56. The cross member 56 is pivotally mounted, intermediate its ends, to an arm 60 which, in turn, is pivotally mounted at 61 to a bracket 62 fixedly secured to the side plate 22.

The arm 60 is yieldingly urged inwardly toward the conveyors 31, 33 by a spring pressed plunger 63 mounted in a cylindrical casing 64 carried by a bracket 65 having a horizontally disposed portion positioned on the center rib 67 of bracket 38.

The rear end of the lever 60 is formed with a shoulder normally engaging a shoulder 66 formed on the control member 68 of a one-revolution clutch 69. When a pair of containers engage the bars 55, the arm 60 is moved in a clockwise direction, FIGURE 5, about the pivot 61 out of engagement with the clutch control member 68.

The machine is powered by a motor 70, FIGURE 2, the output shaft 71 of which is connected to a shaft 73 through an overload clutch 74, the shafts 71, 73 being vertically disposed, and the latter being journalled in a bearing 75, fixedly secured to the side plate member 22. The motor 70 effects continuous rotation of the shafts 71, 73 and the clutch 69, when tripped by operation of arm 60, effects one revolution of a shaft 77 on which is mounted a cam 78. The shaft 77 is journalled in a bearing 80 fixed to the side plate 22 and has affixed to its upper end a beveled gear 81 arranged in mesh with bevel gear 82 mounted on a jack shaft journalled in a bearing bracket 83, also fixed to the side plate 22 at the upper end thereof. A spur gear 85 is fixed to the opposite end of this shaft and is arranged in mesh with a spur gear 86 mounted on a cam shaft 87 journalled in bearings 88, 89 mounted on a lateral extension 90 of the top plate 24. The bevel gears 81, 82, and the spur gears 85, 86 are one to one ratio, whereby upon one revolution of the shaft 77, one revolution is imparted to the cam shaft 87.

Figure 4:
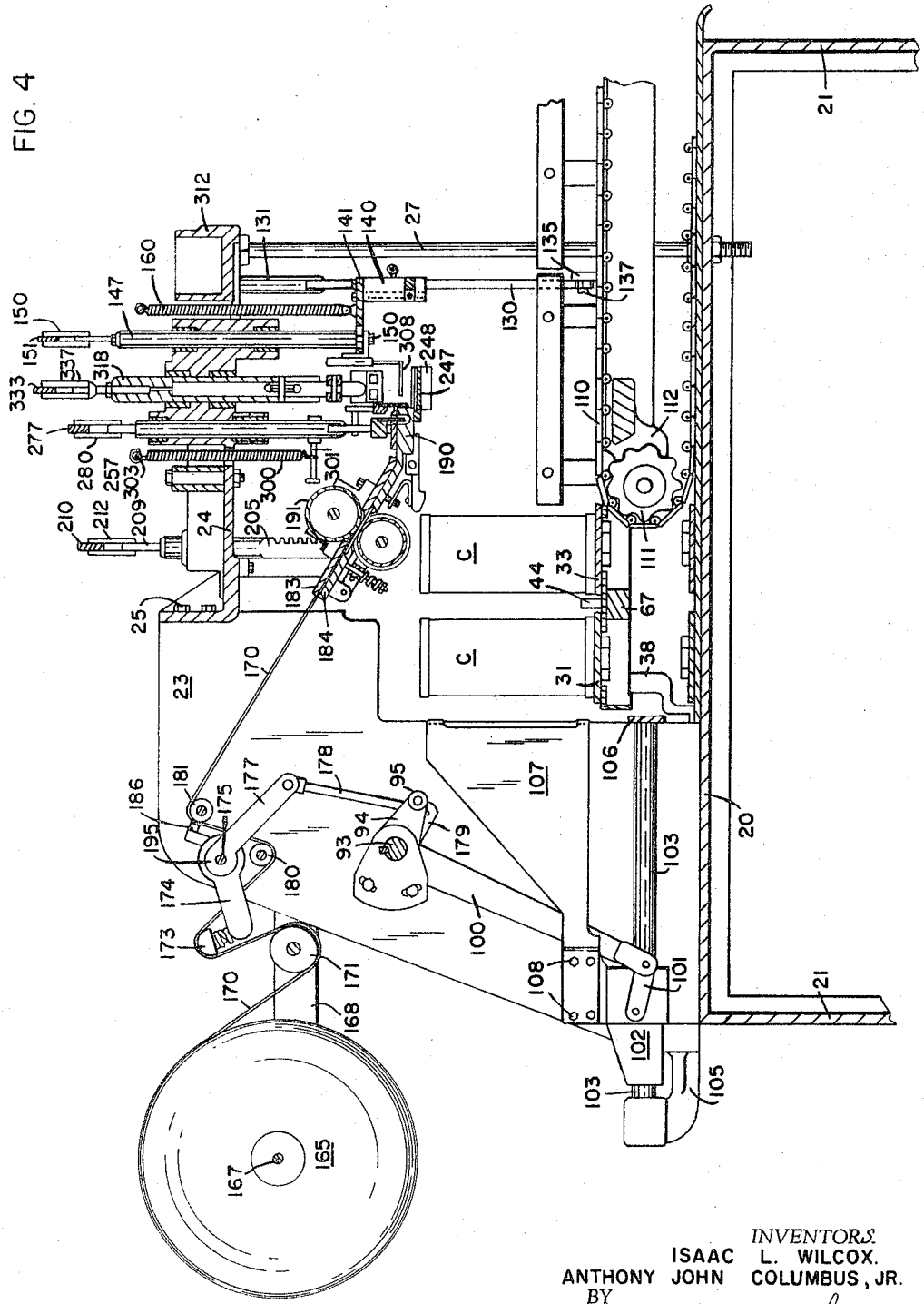
FIGURE 4 is a view taken on line 4—4, FIGURE 1.

In FIGURE 4, the side plate 22 has been removed. Referring to this figure, a shaft 93 is journalled transversely in the side plates 22, 23. An arm 94 is fixedly secured to this shaft and carries at its free end a roller 95 extending through an aperture in the side plate 22 for engagement with the cam track 97 formed in the periphery of cam 78 fixed on the shaft 77, see FIGURE 2. When the clutch 69 is tripped, the cam 78 imparts a counter-clockwise movement to the arm 94 and shaft 93. An arm 100 is fixed to the central portion of the shaft 93 and extends downwardly, and has its lower end pivotally connected to a link 101 which, in turn, is pivotally connected to a carriage 102. The carriage 102 is slidably mounted on rods 103, 104, see FIGURES 2 and 5. The rear ends of the rods 103, 104 are mounted in a bracket 105 secured to the rear ends of the side plates 22, 23. The forward ends of these rods are mounted in a cross bar 106 secured to the forward edges of the side plates.

A U-shaped container engaging member 107 is fixedly secured to the carriage 102, as by screws 108, see FIGURES 4 and 5. It will be apparent, upon rotation of the cam 78 imparting counterclockwise movement to shaft 93, this arrangement effects forward movement of the carriage 102 along the guide rods 103, 104 by action of arm 100 and link 101. The assembly, including the member 107, accordingly forms a pusher to push the pair of containers, see FIGURE 4, forwardly.

Figure 15:
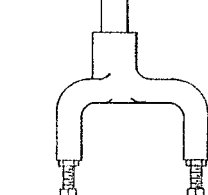
FIGURE 15 is a side elevational view of the outer end portion of the out-feed conveyor.

The pair of containers are advanced by the pusher assembly from the in-feed conveyors 31, 33 onto an out-feed conveyor 110. This out-feed conveyor, like the in-feed conveyors 31, 33, is of standard construction, but employs only one chain which is trained about a sprocket 111 journalled in a bracket 112. Angle iron members 113, FIGURE 14, are secured to the sides of the bracket 112, as by screws 114, which extend through angle braces 115 and through a spacer block 116, and thread into the bracket 112. The angle braces 115 abut against the adjacent angle rail 41 of the in-feed conveyor 33, and are fixed to the sprocket bracket 38, as by screws 117. The outer ends of the angle rails 113 are supported, see FIGURE 15, by a pedestal 119. A bearing bracket 120 is fixed to the other ends of the angle rails 113, as by screws 121, the bracket being attached to the upper end of the pedestal 119. A conveyor chain sprocket 123 is journalled in the bracket 120. A motor 125 is mounted on the pedestal 119, and is operatively connected to the sprocket 123 by a chain drive 127. The conveyor 110 operates continuously and at relatively high speed.

As the pair of containers are advanced by the pusher assembly from the in-feed conveyors 31, 33 onto the out-feed conveyor 110, stops are moved inwardly over the out-feed conveyor to arrest the forward movement of the pair of containers and position them in registration with the handle band applying mechanism.

Figure 10:
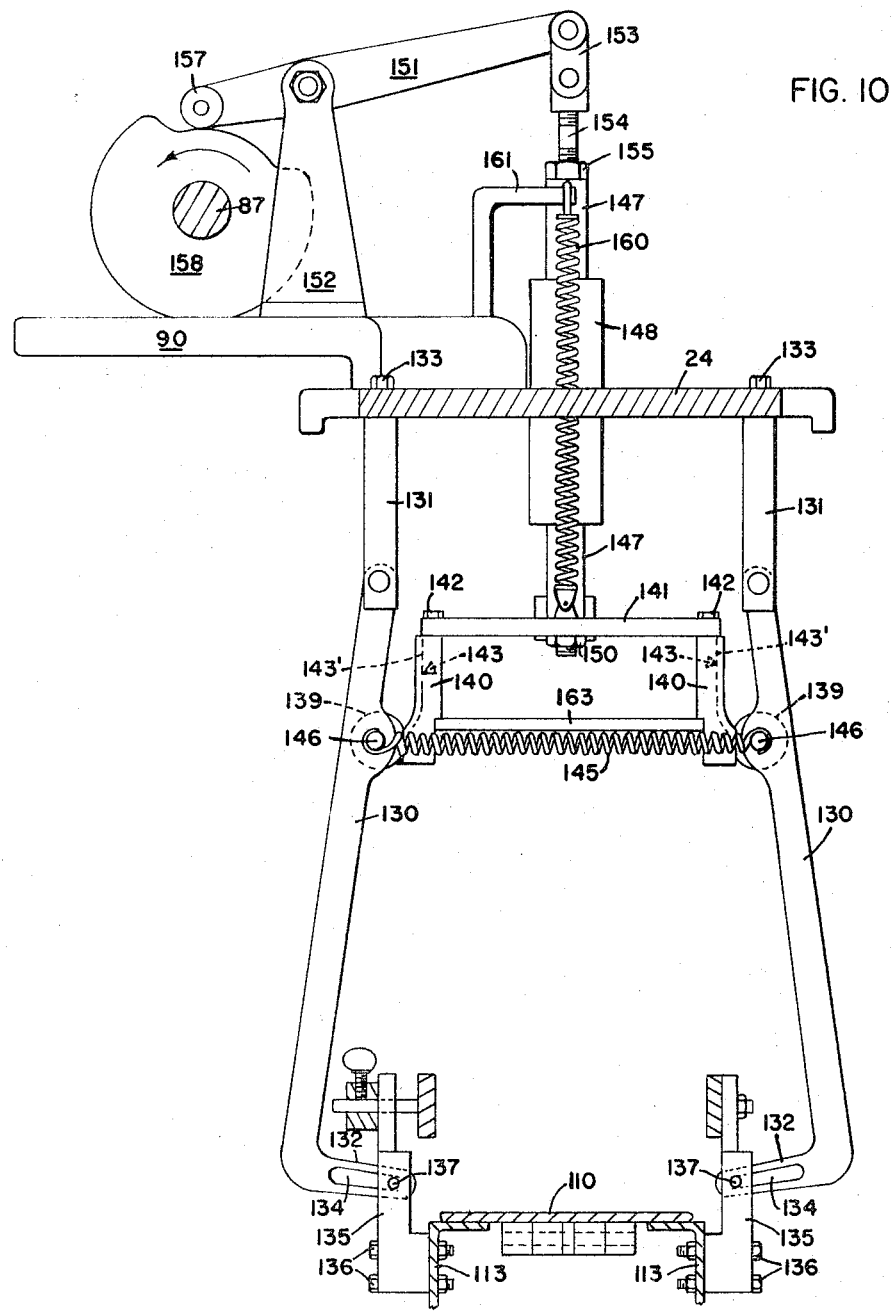
FIGURE 10 is a view taken on line 10—10, FIGURE 6.

In the form disclosed, these stop members consist of bars 130 pivotally mounted at their upper ends to members 131 depending from the top plate 24 and secured thereto, as by screws 133, see FIGURES 3, 4 and 10. The lower ends 132 of the stop members 130 are bent inwardly and formed with elongated slots 134. Blocks 135 are secured to the angle iron rails 113, as by screws 136. A shouldered screw 137 is threaded into the upper portion of the blocks 135 extending above the plane of the upper run of the conveyor chain 110. These screws 137 extend through the slots 134 of the stop members.

The stop members 130 are provided with rollers 139 intermediate their ends, these rollers engaging cam blocks 140 secured to the ends of a cross member 141, as by screws 142. The outer surfaces of the blocks 140 are formed with cam grooves 143 to receive the rollers 139. The upper portion of these grooves 143' is displaced inwardly from the lower portion of the grooves, see FIGURE 10. Accordingly, as the cross member 141 and the blocks 140 are moved downwardly from the position shown in FIGURE 10, the members 130 are moved inwardly by tension spring 145, the ends of which are fixed to pins 146 on which the rollers 139 are journalled.

The cross plate 141 is secured to the lower end of a push rod 147 mounted for vertical sliding movement in a boss 148 formed in the top plate 24. The cross plate 141 is formed with an elongated slot 149, FIGURE 11, and the lower end of the push rod 147 is flattened on opposite sides for insertion in the slot. A nut 150 is threaded on the lower end of the rod. This arrangement provides for adjustment of the plate relative to the push rod in a direction lengthwise of the conveyor 110, and fixedly secures the plate in adjusted position to the push rod, and prevents relative rotation between the plate and the rod. A lever 151 is pivotally mounted, intermediate its ends, to an upstanding bracket 152 secured to the shelf portion 90 of the top plate 24. One end of the lever 151 is pivotally connected to a pair of links 153 which, in turn, are pivotally connected to an adjustable eye bolt 154 threaded into the upper end of the push rod 147 and secured in adjusted position by jam nut 155. The opposite end of the lever 151 is provided with a roller 157 engaging the peripheral surface of a cam 158 fixed on the forward end of the cam shaft 87, see FIGURES 1, 2 and 10. The cross member 141 is urged upwardly by tension spring 160 fixed at its lower end to the cross member and at its upper end to a bracket 161 mounted on the top plate 24.

The cam shaft 87 is rotated during the advancement of a pair of containers by the pusher assembly, and the timing is such that the roller 157 is engaged by the high portion of the cam 158 prior to the time the leading container of the pair is in proximity to the stops 130, whereby the plate 141 and the cam block 140 are moved downwardly to permit the lower end portions 132 of the contanier stops 130 to move inwardly over the out-put conveyor 110. These end portions 132 are engaged by the lower portion of the forward side of the leading container of the pair, and the top portion is engaged by a stop member 163 extending between the cam blocks 140. This upper stop member 163 is formed with end portions 164 diverging rearwardly and which serve to center the leading container in a direction transversely of the conveyor 110, see FIGURE 11.

While the pair of containers dwell against the stops 132, 163, the handle band is applied to the pair of containers. This band is formed of thin sheet material coated on the under side with thermoplastic material.

Figure 1:
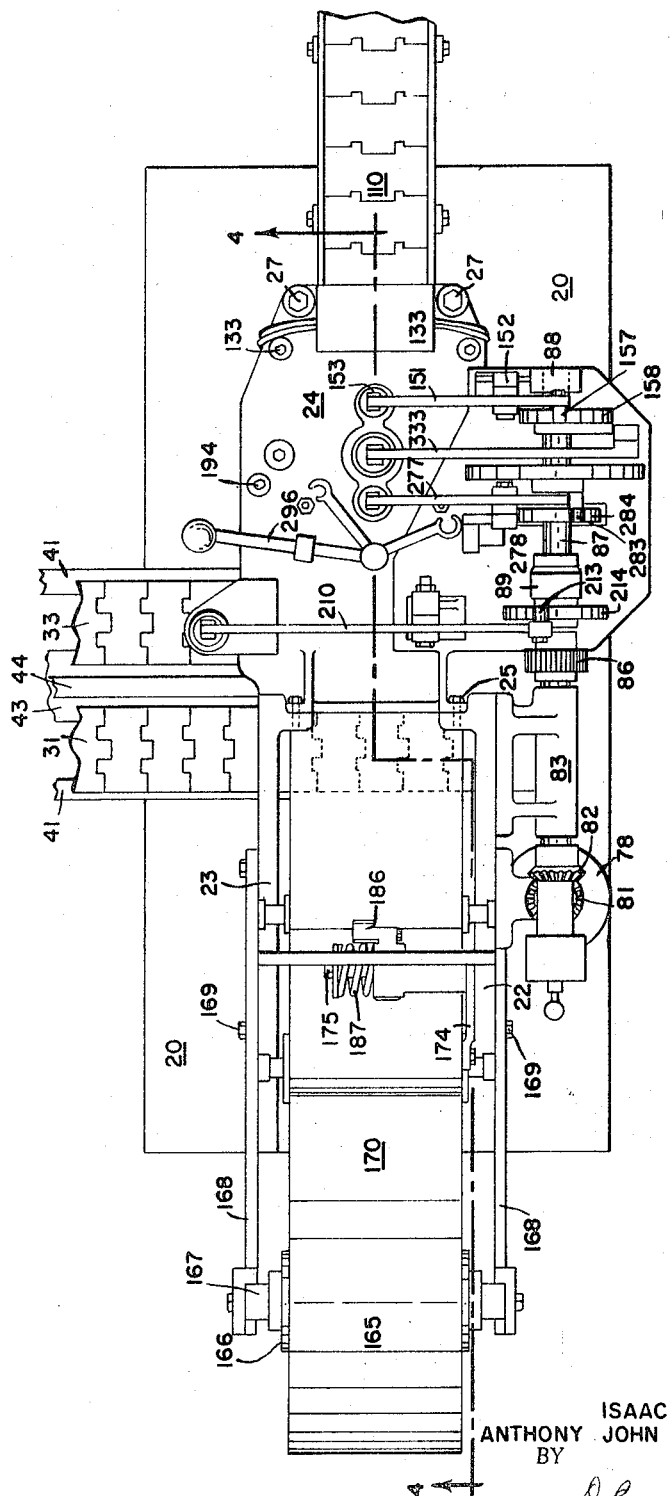
FIGURE 1 is a top plan view of a machine embodying our invention.

Referring to FIGURES 1, 2 and 4, a roll 165 of thin, flexible, sheet material is mounted on a core 166 rotatably mounted on a shaft 167 supported by a pair of arms 168 secured to the side members 22, 23, as by screws 169, and extending rearwardly therefrom. The web 170 of the material is trained about an idler roll 171 mounted between the arms 168, and then upwardly over a slack forming bar 173. This bar is carried by an arm 174 pivotally mounted on a stud 175 extending inwardly from the side plate 22. The arm 174 is connected to an arm 177, the free end of which is connected to a link 178, the opposite end of which is connected to an arm 179 affixed to the shaft 93. The web 170 passes over the slack former 173 about an idler roll 180, and upwardly over a third idler roll 181. The web inclines downwardly from the roll 181, and extends between a pair of upper and lower web guide plates 183, 184. A web brake 186 is mounted on the stud 175 and is operatively connected to the arm 174 through a torsion spring 187, FIGURE 1. Upon clockwise rotation of the shaft 93, the brake 186 is moved against the web 170, pressing the same against the roll 181. Upon further clockwise movement of the arms 174, 177, the slack forming bar 173 is moved upwardly to draw the web from the roll 165.

Figure 11:
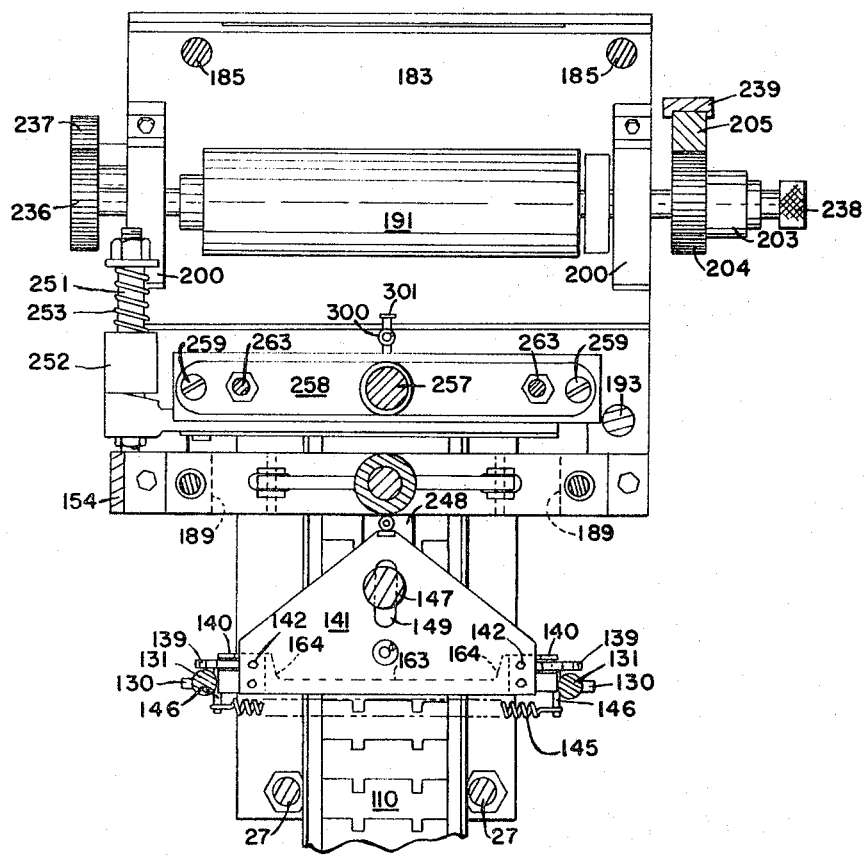
FIGURE 11 is a view taken on line 11—11, FIGURE 6.

The guide plates 183, 184 are secured together at their side edges and are supported at their upper ends by posts 185 fixedly secured to and depending from the top plate 24, see FIGURES 6 and 11. These film guide plates 183, 184 incline downwardly from the rear supporting posts 185. The lower portion of the lower plate 184 is formed with a horizontally forwardly extending portion 190. The confronting surfaces of the plates 183, 184 are formed with a lengthwise extending passage to accommodate the web 170, and both plates are formed with transversely extending aligned cut-outs, intermediate their ends, to permit upper and lower web feed rolls 191, 192 to engage the web.

Figure 8:
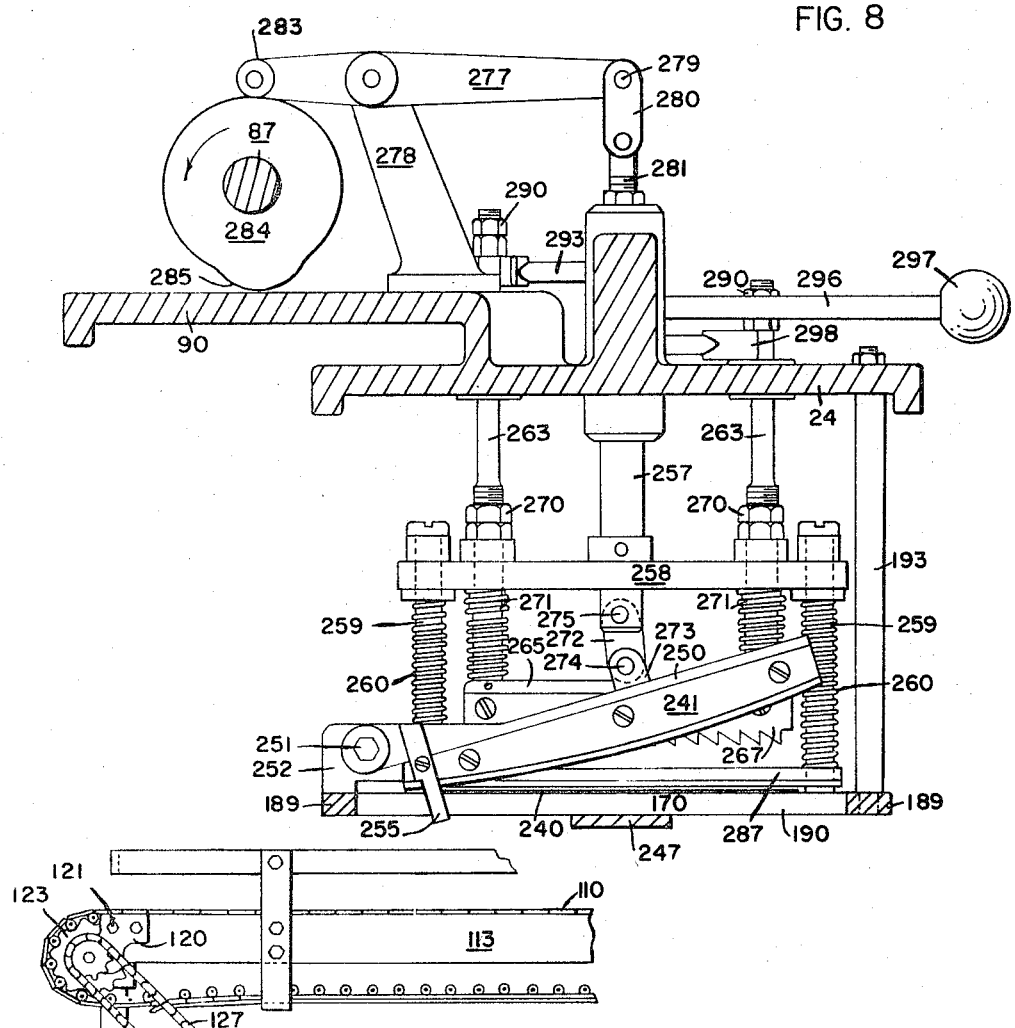
FIGURE 8 is a view taken on line 8—8, FIGURE 6.

The lower horizontal end portion 190 of the plate 184 is formed at each side edge with a forwardly extending projection 189, see FIGURES 8 and 11. This forward end of the plate 184 is supported by a post 193 secured to the top plate, as by screw 194, FIGURES 1, 8 and 9, the lower end of the post 193 being secured in one of the projections 189. A strap 195 is secured at its upper end by screw 196 to the plate 24, and at its lower end by screw 197 to the projection 189 at the forward side of the lower plate.

Immediately, when the one-revolution clutch 69 is tripped by a pair of containers engaging bars 55, rotary motion is imparted to the web feed rolls 191, 192. The roll 191 is fixedly secured to a shaft 198 journalled at its ends in bearings 199 mounted in holding blocks 200 fixedly secured to the top plate 183, as by screws 201, see FIGURE 6. An over-run clutch 203 is secured to the rear end of the shaft 198 and carries a pinion gear 204 which is arranged in mesh with a gear rack 205 mounted for vertical reciprocation in a block 207 secured to the top wall 24. The upper portion 208 of the rack is circular in cross section and has adjustably secured to its upper end an eye bolt 209, FIGURE 7.

A lever 210 is pivotally mounted, intermediate its ends, on a bracket 211 secured to the shelf portion 90 of the top wall. One end of the lever 210 is connected to the eye bolt 209 by a pair of links 212, the opposite end of the lever 210 provided with a roller 213 engaging the periphery of a cam 214 mounted on the cam shaft 87. The roller is maintained in engagement with the cam 214 by means of a tension spring 216. When the cam 214 is rotated, the roller 213 is engaged by the high portion 217 of the cam, moving the forward end of the lever 210 upwardly and effecting downward movement of the rack 205 and, through the clutch 203, rotation of the shaft 198 and roll 191 in a direction to feed the web forwardly from the supply roll 165.

The lower roll 192 serves to maintain the web into frictional engagement with the upper roll 191. This lower roll 192 is mounted on a shaft 220 journalled in forwardly extending end portions 221 of a bracket 222. This bracket is formed with rearwardly extending portions 223, see FIGURE 16, apertured to receive a pin 224 mounted in bosses 225 depending from the bottom plate 184.

The bracket 222 is formed centrally with an aperture through which a screw 225′ extends, and which is threaded into the bottom plate 184. A helical compression spring 226 is mounted on the screw, and serves to yieldingly urge the bracket upwardly to urge the bottom roll 192 into engagement with the web, and to move the same into engagement with the under side of the top roll 191.

The bottom roll 192 is provided with a covering 227 of yieldable material, such as rubber, and this covering is formed with axially spaced apart circumferentially extending grooves 230, see FIGURE 7. These grooves 230 provide spaces to receive wires 231, which extend across the opening formed in the lower plate to permit the feed rolls 191, 192 to engage the web. The purpose of the wires 231 is to provide support for the free end of the web when it is initially fed between the rolls by hand, the wires serving to prevent the thin web from passing downwardly through the apertures in the lower plate.

Arrangement is provided for manually moving the bracket 222 and the roll 192 downwardly to permit initial feeding of the web between the rolls. This arrangement consists of a shaft 233 journalled in the rear extensions 223 of bracket 222. A cam 235 is fixed to the shaft 233 and, upon rotation of the shaft, the cam 235 engages the under surface of the plate 184, moving the bracket downwardly, and moving the roll 192 downwardly away from the roll 191. A handle 234 is fixed to the shaft 233 for convenient rotation thereof.

A spur gear 236 is keyed to the forward end of shaft 198, and is arranged in mesh with a gear 237 keyed to the forward end of shaft 220. The gears 236 and 237 effect rotation of the rolls in unison. A finger knob 238 is fixed to the rear end of the shaft 198 for convenience of manually rotating the shaft and the rolls, this operation being permitted by the over-running clutch 203. The rack 205 is maintained in proper mesh with the gear 204 by a bracket 239 fixedly secured to the top plate 24 and being formed with a groove for slidably receiving the rack, see FIGURES 7 and 11.

A shear bar 240, FIGURES 6 and 8, is mounted on the top surface of the lower plate extension 190 at the forward end thereof. A shear blade 241 is cooperable with the bar 240 to shear the end portion from the web. The web 170 has a width in excess of the crosswise dimension of the container C, whereby when the end portion of the web positioned above the junction between the pair of containers is severed from the web, and the ends of the severed pieces are heat-sealed to the pair of containers, a handle band is provided for the pair of containers which extends in more or less arcuate form above the containers, whereby it is convenient to insert the fingers under the central portion of the band for lifting the containers.

The timing of the machine cycle is such that upon tripping the one-revolution clutch 69, the cam shaft immediately begins to rotate, moving the portion 217 of cam 214 into engagement with the roller 213, whereupon rotation is imparted to the web feed rolls 191, 192. Upon a few degrees further rotation of the cam shaft 87, the pusher assembly moves forwardly to advance the pair of containers from the infeed conveyors 31, 33. When the pusher has travelled forwardly somewhat more than one-half the length of its stroke, cam 158 effects downward movement of the plate 141, and cam blocks 140 to effect inward movement of the stop members 132 and downward movement of the top stop 163. When the pusher has reached the end of its forward stroke, the pair of containers are pressed against these stop members. As the containers engage the stop members, a latch 245, FIGURE 6, pivotally mounted on the lower extension 190 of plate 184 engages the rear top edge of the rear of the pair of containers. Accordingly, the latch 245 and the stops 132, 163 serve as means for clamping the pair of containers in close abutting relation.

The rotation of the feed rolls 191, 192 by the downward movement of the rack 205 effects feeding of the web 170 a predetermined distance beyond the shear blade 241. This extending end portion of the web is fed over a support 247 fixed to the extension 190 of the lower film guide plate, see FIGURES 6 and 9. Wing members 248 are secured to the support 247 and incline downwardly and laterally therefrom, see FIGURES 8 and 9.

The shear blade 241 is attached to an arm 250 pivotally mounted on a stud 251 supported by a block 252 fixed to the lower plate extension 190. The shear blade 241 is shown in its up position in FIGURE 8. The stud 251 is urged rearwardly by a compression spring 253 which functions to hold the shear in shearing engagement with the shear plate 240, see FIGURE 4. The arm 250 has fixed thereto a depending member 255 positioned for engagement with the shear plate 240 to maintain the shear blade 241 in proper registration when it is moved to the full-up position, as shown in FIGURE 8.

The shear blade 241 is moved downwardly for the shearing operation by a push rod 257 slidably mounted in the top plate 24, see FIGURE 6. The lower end of the push rod 257 is fixedly secured at its lower end to a cross bar 258 apertured at its ends to slidably receive guide pins 259 threaded into the lower guide plate. A compression spring 260 is positioned on each of the guide pins 259 and serves to yieldingly urge the cross member 25ª upwardly.

The cross member 258 is formed with a second pair of apertures to slidably receive guide pins 263, which extend upwardly through the top plate 24 in which they are also slidably mounted. The guide pins 263 extend downwardly through the cross member 258 and are fixedly secured at their lower ends to a block 265 to which is secured a slitting or perforating blade 267, see FIGURES 8 and 13.

The intermediate portions of the guide pins 263 are threaded to receive nuts 270. Helical compression springs 271 are positioned on the pins 263 and are interposed between the cross member 258 and the block 265, these springs urging the block downwardly from the cross member, and the spacing between the cross member and the block is determined by the adjustment of the nuts 270.

The shear arm 250 is formed with an upwardly extending boss 273, apertured to receive a pin 274 which extends rearwardly, and is connected to the lower end of a link 272. The upper end of this link is pivotally connected to the lower end of the push rod 257 by a pin 275.

A lever 277, FIGURE 8, is pivotally mounted intermediate its ends to a bracket 278 extending upwardly from the shelf 90 of the top plate 24. One end of the lever 277 is pivotally connected at 279 to a link 280 which, in turn, is pivotally connected to an eye bolt 281 adjustably mounted in the top of the push rod 257. The lever 277 is provided at its opposite end with a roller 283 engaging a cam 284 mounted on the cam shaft 87. When this roller is engaged by the lobe 285 of the cam, the push rod 257 is moved downwardly, moving the shear blade 241 about its pivotal mounting 251 into shearing engagement with the web to sever the end portion thereof, positioned on the support 247. Also, downward movement of the block 265 may be effected.

This downward movement of the push rod 257 also effects downward movement of a presser pad 287 which is fixed to the lower ends of the guide pins 259. The horizontal forward portion 190 of the guide plate 184 is formed, intermediate its side edges, with a transversely extending groove 289, and the presser pad 287 is formed with a complemental slot. Upon downward movement of the perforating blade 267, the teeth of the blade pass through the web and into the groove 289. The blade 267 is positioned forwardly of the shear blade 241 a distance equivalent to one-half of the width of the end portion severed from the web by the shear. The perforating blade 267 is of such length as to perforate the web the major portion of the width thereof, but with the perforations terminating in spaced relation from the sides of the web, that is, from the ends of the severed end portion. With this arrangement, the subsequent severed end portion of the web, applied to the pair of containers to provide the handle band, is perforated midway between its sides and the major portion of its length.

The perforated handle band is employed in cases where it is desired to separate the containers of the pair prior to shipment. Because the handle band is perforated, except for the end portions that are heat sealed to the container side walls, these short, unperforated end portions of the handle band are readily severed, either by hand, or by means hereinafter referred to.

If it is desired to produce a multi-unit package—that is, if it is desired to maintain the pair of containers fixedly secured together by the handle band, the perforating blade 267 is not actuated. The perforate blade is rendered inoperable by the following mechanism.

Figure 12:
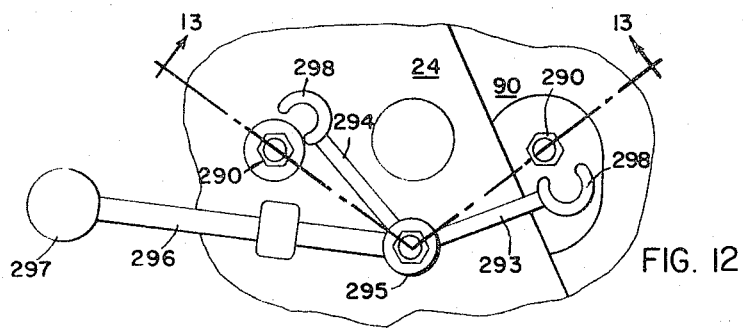
FIGURE 12 is a top plan view of the mechanism for locking out the film perforating blade.
Figure 13:
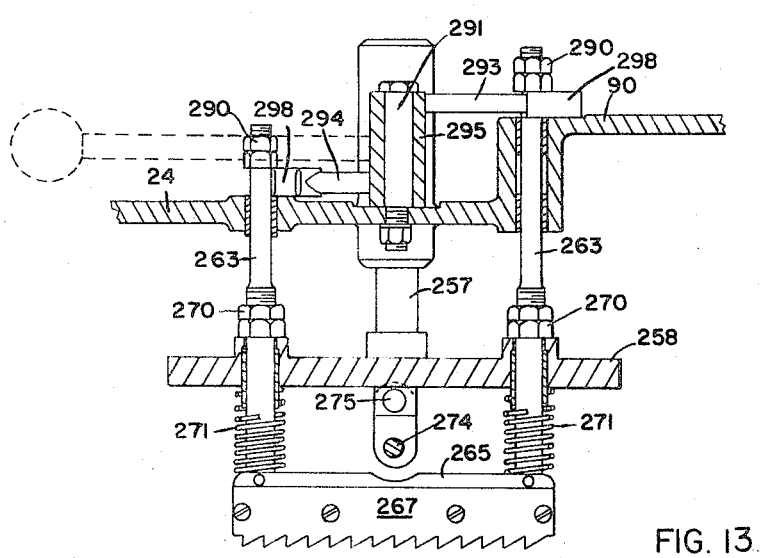
FIGURE 13 is a vertical sectional view taken on a line corresponding to line 13—13, FIGURE 12.

Referring to FIGURES 8, 12 and 13, the upper ends of the guide pins 263 are threaded to receive nuts 290. These nuts are locked in adjusted position so that they extend upwardly from the surface of the top plate 24 when the push rod 257 is moved to its up position, as shown in FIGURE 8. An angle lever is journalled on a vertical stem 291 extending upwardly from the top wall 24. This lever has arms 293, 294, extending radially from the hub portion 295. A third arm 296 extends radially from the hub, and is provided at its outer end with a knob 297. This arm serves as a manual for moving the angle lever about its pivot 291. The outer ends of the arms 293 and 294 are provided with semi-circular members 298, having the open sides confronting the guide pins 263. When the push rod is in the up position, as shown in FIGURE 8, the members 298 may be moved about the pins 263 under the nuts 290. When the members 298 are so positioned, the block 265 and blade 267 are maintained in the up position. Rownward movement of the push rod 257 simply compresses the springs 271. If it is desired to have the handle band perforated, the angle lever is moved about its pivot 291 to the position shown in FIGURE 12, permitting actuation of the blade 267 by the push rod 257. The push rod 257 is urged upwardly by tension spring 300 connected at its lower end to a pin 301 extending rearwardly from the cross member 258. The spring extends upwardly through an aperture in the top plate 24, and its upper end is connected to a bracket 303 mounted on the top plate 24.

At the completion of the forward movement of the web to position the end portion thereof on the support 247, the push rod 147 is moved downwardly and the cross plate 141 carries means for clamping the end portion of the web on the support 247. This clamping structure includes a cylindrical member 305 connected by an angle bracket 306 to the rear end of the plate 141. The cylindrical housing is vertically disposed, and in it there is slidably mounted a plunger 307 spring pressed downwardly, see FIGURE 6. When the plate 141 has been moved to down position to arrange the container stops for engagement by the leading container of the pair, a blade 308, secured to the lower end of the plunger 307, presses the end portion of the web against the support 247, whereby this end portion is held fixed at its center during severance from the web by the shear blade 241, and during the sealing of the ends of the severed end portion to the slides of the pair of containers.

The upper surface of the support 247 is formed centrally with a recess extending lengthwise of the support. When the clamp blade 308 is moved downwardly, it draws the center part of the severed end portion into this depression. Accordingly, as the ends of the severed portion have been heat sealed to the pair of containers, and the clamp blade 308 moves upwardly with the upward movement of the plate 141, the center part of the handle band that was moved into the depression in the support 247 now forms slack in the handle band so that the central portion thereof moves upwardly out of engagement with the support and the wing parts 248. That is, when released, the handle band has clearance with the support and wing parts 248 for the free forward movement of the pair of containers from the handle applying station.

At the time the end portion of the web is severed, the pair of containers have been advanced to position the junction between the containers below the center of the support 247. Immediately thereupon, a pair of heating jaws 310 move downwardly to move the ends of the severed portion over the sides of the containers, and then move inwardly to press these end portions against the sides of the containers and heat seal the end portions thereto. The jaws 310 are equipped with electrical heating elements and are supplied with power by conductors 311 extending downwardly from a junction box 312 mounted at the forward end of the top plate 24, see FIGURE 2. The jaws 310 are mounted at the lower ends of arms 313 pivoted intermediate their ends at 314 to a cross member 315. The upper ends of the arms 313 are pivotally connected to links 317, see FIGURE 9.

A push rod 318 is mounted for vertical movement in the top wall 24. The lower portion of this push rod is bored out to provide a cylindrical sleeve portion 319. A slot 320 is formed in the opposite sides of this sleeve portion. A plug 321 is slidably mounted in the sleeve portion 319, and is fixedly secured to the cross member 315, as by pin 322. The plug 321 is formed intermediate its ends with a slot 323 extending therethrough, this slot being arranged in register with the slots 320 in the sides of the sleeve member 319. The inner ends of the links 317 extend through the slots 320 into the slot 323 and are connected together by a pin 324. Opposite sides of the sleeve 319 are apertured to receive the pin 324, and the plug is formed with an axially extending slot 325 through which the pin 324 also extends. The pin is positioned at right angles to the slots 320, 323. A helical compression spring 327 is positioned in the sleeve portion 319 of the push rod 318 and acts against the top of the plug 321 and the top wall of the bore in the sleeve portion.

When the push rod 318 is moved upwardly, the pin 324 moves with the push rod. However, during the initial portion of this upward movement, the plug member 321, and the cross member 315 remains in down position by action of the spring 327. Moving the pin 324 upwardly, relative to the cross member 315, effects inward movement of the upper ends of the arms 313 and outward movement of the jaws 310. When the pin 324 engages the upper end of the slot 325, the plug member 321 and the cross member 315 is then moved upwardly to the position shown in FIGURE 6. Upon initial downward movement of the push rod 318, the cross member 315 is moved downwardly until adjustable stop screws 330, carried by the cross member 315, engage the end portions 189 of plate 184. The jaws 310 are now positioned in registration with the sides of the pair of containers. Upon further downward movement of the push rod 318, and the pin 324 carried thereby, the inner ends of the links 317 are moved downwardly, effecting outward movement of the upper ends of the arms 313, and movement of the jaws 310 against the ends of the severed band to press the same into heat sealing engagement with the sides of the containers.

The push rod 318 is actuated by an angle lever 333 pivotally mounted, as at 334, to a bracket 335 extending upwardly from the shelf portion 90 of the top plate 24. The inner end of the arm 330 is pivotally connected to links 337 which, in turn, are pivotally connected to an eye bolt 338 adjustably mounted in the upper end of the push rod 318.

The lever 333 has a depending arm 340 carrying at its lower end a roller 341 positioned in a cam groove 343 formed in the side surface of a cam disk 345 fixedly mounted on the cam shaft 87. The cross member 15 is guided in its vertical movement by a pair of guide posts 347 fixedly secured at their upper ends to the top plate 24 and being fixedly secured in the lower plate extensions 189.

Figure 9:
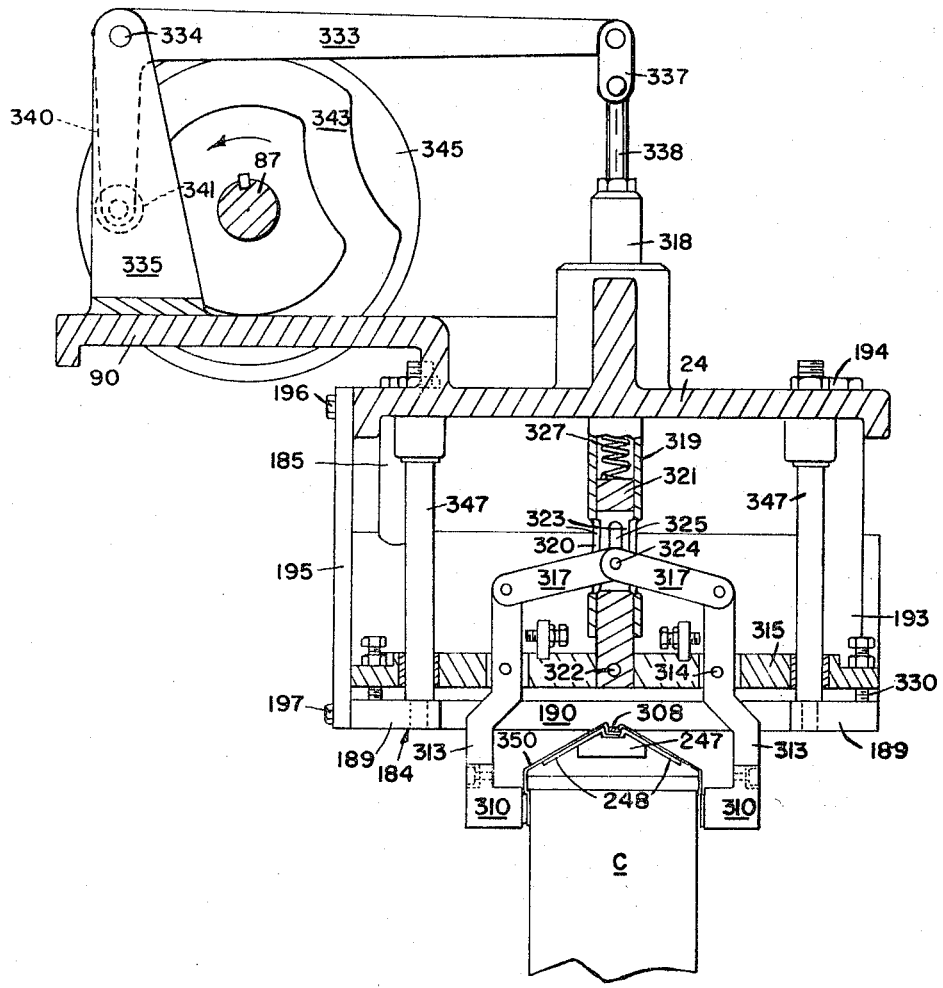
FIGURE 9 is a view taken on line 9—9, FIGURE 6.

The sealing jaws 310 are illustrated in FIGURE 9 in heat sealing position bonding the handle band 350 to the pair of containers. In FIGURE 3, the handle band has been applied, and the jaws 310 moved to up position. The blade 308 has been moved upwardly from the support 247, and the stops 130 have been moved outwardly for advancement of the pair of containers by the out-feed conveyor 110.

What we claim is:

1. A machine for applying a handle band of heat sealable sheet material to a pair of containers rectangular in cross section and arranged in upstanding side by side abutting relation, including web feed means operable to feed a web of sheet heat sealable material to position the end portion of the web transversely of the pair of containers above the junction thereof and parallel thereto, a shear extending transversely of the web and operable to sever said end portion of the web, a support means for supporting the central portion of the severed piece, a pair of heat sealing jaws positioned above the ends of said severed piece, jaw actuating means operable to move said jaws downwardly into engagement with the ends of the severed piece and press the same into heat-sealing engagement with opposite sides of the pair of containers at the junction thereof, and cycling mechanism for operating said web feed means, shear and jaw actuating means in timed relation.

2. A machine for applying a handle band of sheet heat-sealable material to a pair of containers rectangular in cross section, comprising container clamping means operable to maintain a pair of said containers in upstanding side by side abutting relation, means for feeding a web of sheet heat-sealable material to position the end portion of the web above the junction between said pair of containers, a shear operable to sever said end portion of the web, supporting means for supporting said severed piece at the center thereof, a pair of heat-sealing jaws, jaw actuating means operable to move said jaws downwardly into engagement with the ends of said severed piece, and press the same in heat-sealing relation against the sides of the pair of containers at the junction thereof, and cycling mechanism for operating said container clamping means, web feed means, shear and jaw actuating means in timed relation.

3. A machine for applying a handle band of sheet heat-sealable material to a pair of containers rectangular in cross section, a container pusher, a container in-feed conveyor operable to advance a pair of containers in juxtaposition to said pusher, said pusher being operable to push said pair of containers onto a single file outfeed conveyor, container clamping means operable to clamp said pair of containers positioned on said out-feed conveyor in side by side upstanding abutting relation, a web feed mechanism operable to feed a web of sheet heat-sealable material to position the end portion of the web above the junction between said pair of clamped containers, a shear operable to sever said end portion of the web, a supporting means for supporting said severed end portion at the center thereof, a pair of heat-sealing jaws, jaw actuating means operable to move said jaws downwardly into engagement with the ends of said severed end portion, and press the same in heat-sealing relation to the sides of the containers at the junction therebetween, and cycling mechanism for operating said pusher container clamping means, web feed mechanism, shear, and jaw actuating means, in timed relation.

4. A mechanism as defined in claim 1, including means operable to perforate said end portion of the web in a lengthwise direction intermediate its ends prior to severance of the end portion from the web.

5. Mechanism for applying a handle band of heat-sealable sheet material to a pair of containers rectangular in cross section and arranged in upstanding abutting relation, comprising web feed means operable to feed a web of sheet heat-sealable material to position the end portion of the web transversely of the pair of containers above the junction thereof and parallel thereto, a shear operable to sever said end portion of the web, a preforating blade positioned above said web and extending parallel to said shear in spaced relation thereto and being vertically reciprocable into and out of engagement with said end portion, blade actuating means operable to move said blade downwardly to perforate said end portion in a lengthwise direction thereof and intermediate its ends prior to the severance of said end portion from the web by said shear, support means for supporting the central portion of the severed piece, a pair of heat sealing jaws movable into engagement with the ends of the severed piece and press the same into heat sealing engagement with the sides of the pair of containers at the junction therebetween, and cycling mechanism for operating said web feed means, perforating blade, shear and jaws, in timed relation.

6. A machine for applying a handle band of sheet heat-sealable material to a pair of containers rectangular in cross section, a container pusher, a container in-feed conveyor operable to advance a pair of containers in juxtaposition to said pusher, said pusher being operable to push said pair of containers onto a single file out-feed conveyor, container stop means movable inwardly over said out-feed conveyor for stopping movement of said pair of containers by said pusher when said containers have reached a predetermined position with the containers of said pair in upstanding side by side abutting relation, web feed mechanism operable to feed a web of sheet heat-sealable material to position the end portion of the web above the junction between said pair of containers, a shear operable to sever said end portion of the web, a supporting means for supporting said severed end portion at the center thereof, a pair of heat sealing jaws, a jaw actuating means operable to move said jaws downwardly into engagement with the ends of said severed end portion and press the same in heat-sealing relation to the sides of the containers at the junction thereof, and cycling mechanism for operating said pusher, stop means, web feed mechanism, shear and jaw actuating mechanism, in timed relation.

7. A machine for applying a handle band of heat-sealable sheet material to a pair of containers rectangular in cross section and arranged in upstanding side by side abutting relation, a shear, a web feeding means for feeding a web of heat-sealable material to position the end portion of the web forwardly of said shear, said web having a width in excess of the width of said containers, a support member for supporting said end portion at the center thereof, shear actuating means operable to move said shear into engagement with the web for severance of said end portion, a pair of heat sealing jaws positioned above the ends of said severed end portion of the web, jaw actuating means operable to move said jaws downwardly into engagement with the ends of said severed end portion and press the same into heat-sealing engagement with the sides of the pair of containers at the junction therebetween, and cycling mechanism for operating said web feeding means and said shear, and jaw actuating means, in timed relation.

8. A machine for applying a handle band of thin, heat sealable sheet material to a pair of containers rectangular in cross section and arranged in upstanding side by side abutting relation including a web guide plate, a shear bar fixed to the end of said guide plate, a support member positioned above the junction between said pair of containers and immediately forwardly of said shear bar, web feeding mechanism operable to feed a web of sheet heat-sealable material along the guide plate to position the end portion of the web on said support, a clamp member operable to clamp said end portion at its center against said support, a shear blade extending transversely of the web and being cooperable with said shear bar to sever said end portion of the web, a pair of heat-sealing jaws positioned above the ends of said severed portion, jaw actuating means operable to move said jaws downwardly into engagement with the ends of the severed piece and press the same into heat-sealing engagement with opposite sides of the pair of containers at the junction therebetween, and cycling mechanism for operating said web feeding means, said clamp, said shear and said jaw actuating means in timed relation.

9. A machine, as defined in claim 8, wherein said support member is fixedly secured to said web guide plate.

10. A machine, as defined in claim 8, including perforating means operable to provide a row of perforations medial of the side edges of said severed end portion prior to severance thereof from the web.

11. A machine for applying a handle band of thin, heat-sealable, sheet material to a pair of containers rectangular in cross section and arranged in upstanding side by side abutting relation, including means for supporting a strip of said material at the center thereof, with said strip extending parallel to the junction between said pair of containers and above the same, a pair of heat-sealing jaws positioned above the ends of said strip, and jaw actuating means operable to move said jaws downwardly into engagement with the ends of the severed piece and press the same into heat-sealing engagement with opposite sides of the pair of containers at the junction therebetween.

12. A machine for applying a handle band of sheet heat-sealable material to a pair of containers rectangular in cross section and arranged in upstanding side by side abutting relation comprising a band applying station, container advancing means operable to present a pair of containers in side by side abutting relation at said station, web feed means operable to feed a web of sheet heat-sealable material with the end portion of the web extending transversely of the pair of containers above the junction thereof and parallel thereto, a shear extending transversely of the web and operable to sever said end portion of the web, means for supporting the central portion of said severed piece above the junction of said pair of containers, a pair of heat-sealing jaws positioned above the ends of said severed piece, jaw actuating means operable to move said jaws downwardly and press the ends of the severed piece into heat-sealing engagement with the sides of said pair of containers at the junction thereof, and means for operating said container advancing means, web feed means, shear and jaw actuating means in timed relation.

13. A machine for applying a handle band of thin flexible sheet material provided with a heat-sealable material coating to a pair of containers rectangular in cross section, comprising a container pusher, a container in-feed conveyor operable to advance a pair of containers in juxtaposition to said pusher, a continuously operating single file out-feed conveyor, said pusher being operable to push a pair of containers from said in-feed conveyor to said out-feed conveyor, container stop means movable over said out-feed conveyor for arresting the pair of containers positioned thereon, means operable to maintain said arrested pair of containers in upstanding side by side abutting relation, a web feed mechanism operable to feed a web of said sheet material in a direction parallel to the movement of said pusher to position the end portion of the web above the junction between said pair of arrested containers, a shear operable to sever said end portion of the web, supporting means for supporting said severed end portion at the center thereof, a pair of heat-sealing jaws, jaw actuating means operable to move said jaws downwardly into engagement with the ends of said severed portion, and press the same in heat-sealing relation to the sides of the containers at the junction therebetween, and means operable to move said container stop members out of engagement with said containers for advancement of the same by said out-feed conveyor.

No references cited.

EARL M. BERGERT, *Primary Examiner.*

W. E. HOAG, *Assistant Examiner.*